(12) United States Patent
Lamberson et al.

(10) Patent No.: US 7,989,373 B2
(45) Date of Patent: Aug. 2, 2011

(54) HERMETIC SEALING MATERIAL

(75) Inventors: Lisa Ann Lamberson, Painted Post, NY (US); Robert Michael Morena, Lindley, NY (US)

(73) Assignee: Corning Incorporated, Corning, NY (US)

( * ) Notice: Subject to any disclaimer, the term of this patent is extended or adjusted under 35 U.S.C. 154(b) by 87 days.

(21) Appl. No.: 12/494,732

(22) Filed: Jun. 30, 2009

(65) Prior Publication Data
US 2010/0331164 A1     Dec. 30, 2010

(51) Int. Cl.
*C03C 8/24* (2006.01)
*C03C 8/04* (2006.01)

(52) U.S. Cl. ............... 501/17; 501/15; 501/26

(58) Field of Classification Search ............ 501/15, 501/17, 26
See application file for complete search history.

(56) References Cited

U.S. PATENT DOCUMENTS

| | | | |
|---|---|---|---|
| 5,256,603 A | 10/1993 | Andrus et al. | 501/32 |
| 6,184,166 B1 * | 2/2001 | Hares et al. | 501/72 |
| 6,291,092 B1 * | 9/2001 | Kohli et al. | 429/495 |
| 6,716,275 B1 | 4/2004 | Reed et al. | 96/10 |
| 7,189,470 B2 * | 3/2007 | Cortright et al. | 429/495 |
| 2008/0299349 A1 | 12/2008 | Gu et al. | 428/137 |
| 2008/0299377 A1 | 12/2008 | Gu et al. | 428/307.7 |
| 2009/0000475 A1 | 1/2009 | Fekety et al. | 95/105 |

FOREIGN PATENT DOCUMENTS

| | | |
|---|---|---|
| EP | 1704909 | 9/2006 |
| JP | 2006/108610 | 4/2006 |
| WO | 2004031088 | * 4/2004 |
| WO | 2008/027410 | 3/2008 |
| WO | 2008/073417 | 6/2008 |
| WO | 2008/106028 | 9/2008 |

OTHER PUBLICATIONS

Haag et al; "Pure nickel coating on a mesoporous alumina membrane: Preparation by electroless plating and characterization"; Science Direct; Surface & Coatings Technology 201 (2006) 2166-2173.
Yin et al; "Development of oxygen transport membrane $La_{0.2}Sr_{0.8}CoO_{3-\delta}/Ce_{0.8}Gd_{0.2}O_{2-\delta}$ on the tubular $CeO_2$ support"; Science Direct' Applied Catalysis A: General 300 (2006) 75-84.
Yoshino et al; "Development of tubular substrates, silica based membranes and membrane modules for hydrogen separation at high temperature"; Science Direct; Journal of Membrane Science 267 (2005) 8-17.
San et al; "Fabrication of glassy ceramic membrane filters for filtration of spring water with clogging phenomena"; Science Direct; Journal of Membrane Science 305 (2007) 169-175.

* cited by examiner

*Primary Examiner* — Karl Group
(74) *Attorney, Agent, or Firm* — Joseph M. Homa; Lisa M. Noni

(57) ABSTRACT

Sealing materials for use with membrane supports, and in particular to sealing materials that can be used to form a glassy coating on the exterior surface of a membrane support to prevent gases from entering or exiting the support via the support's exterior walls.

3 Claims, 1 Drawing Sheet

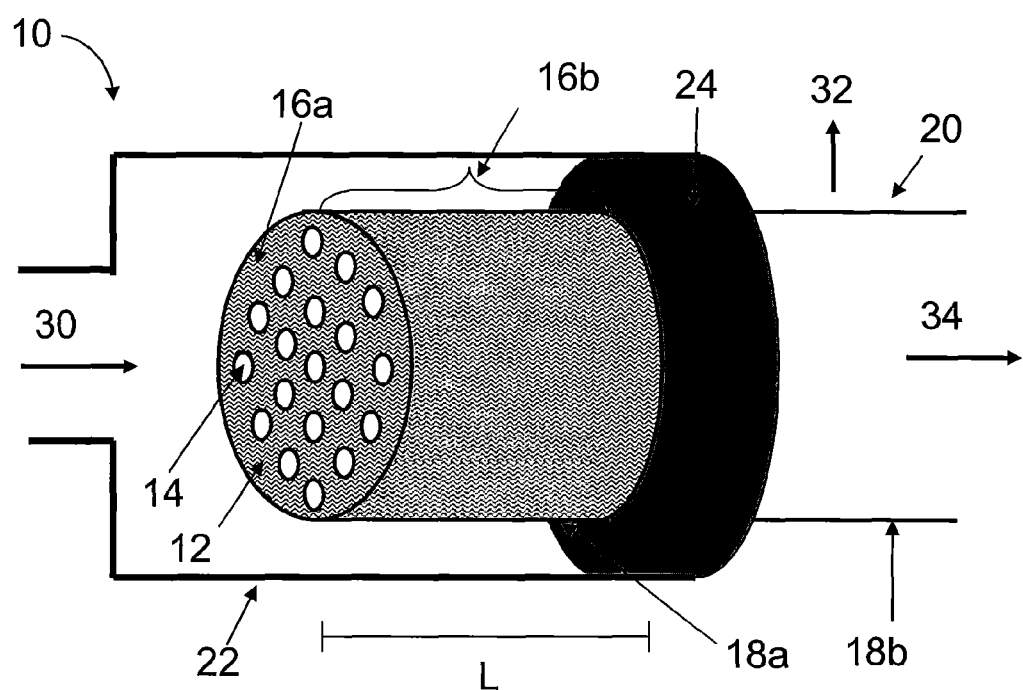
Figure

HERMETIC SEALING MATERIAL

FIELD

The invention is directed to sealing materials for use with membrane supports, and in particular to sealing materials that can be used to form a glassy coating on the exterior surface of a membrane support to prevent gases from entering or exiting the support via the support's exterior walls.

BACKGROUND

Monolith-type membrane structures using a porous support having an array of parallel channels, typically in a cylindrical form, and a gas selective membrane coated on the inner surface of channel walls, offer a higher surface area packing density than a single-channel tube of the same diameter, leading to higher permeation flux. This results in a dramatic reduction of both the membrane cost per surface area and the engineering costs to assemble large surface areas of membrane modules. The structures can be used to solve significant energy and environmental problems; for example, $H_2$ recovery from waste gas streams, $H_2$ purification from a production gas mixture for fuel cells application, $CO_2$ capture from flue gas streams for sequestration, and other separations. These separation applications often require high temperature for better separation performance.

When a mixture gas stream to be separated is supplied into the channels of a monolith ceramic membrane product, it is separated through the membranes coated on the channel walls, and the permeate thereafter passes through pores of the membranes and pores of the support to flow out to an external space. The surface area of two ends of the support exposed to the stream, which includes the end flat surface, and the exterior curved surface of the support, have no membrane coating and therefore need to be sealed with a sealing material in order to prevent the gas stream being treated from entering and passing through the exposed end surface area and then passing through the pores of the support and flowing out of the support with no separation occurring. The separation function is therefore more efficient with a seal coating on the end portion of the support. For separation to occur it is necessary for the gas stream to enter the open area of the channels and flow through the membrane coated channel walls and the outer porous wall of the support.

There is a need for hermetic sealing of the exterior surfaces of an alumina membrane support structure to prevent gases from entering or exiting the support through the exterior surfaces instead of entering the open area of the channels, passing through the membrane coated channel walls and exiting through the unsealed walls of the support.

SUMMARY

One embodiment for high temperature application is an as-batched zinc-alkali-silicate glass composition consisting essentially of in mole percent:
  60-70% $SiO_2$;
  12-18% ZnO;
  6-10% $Na_2O$;
  6-10% $K_2O$;
  1-4% $ZrO_2$; and
  0.5-2.5% $Al_2O_3$.

Another embodiment for high temperature application is an as-batched calcium silicoborate glass composition consisting essentially of in mole percent:
  30-45% $B_2O_3$;
  25-35% CaO;
  23-30% $SiO_2$;
  2-6% $Al_2O_3$; and
  1-5% SrO.

One embodiment for low temperature application is an as-batched mixed alkali-zinc-phosphate glass composition consisting essentially of in mole percent:
  35-50% ZnO;
  25-40% $P_2O_5$;
  5-10% $Na_2O$;
  5-10% $K_2O$;
  1-5% $Li_2O$;
  1-5% $MoO_3$;
  0.5-4% $WO_3$; and
  0.1-4% $Al_2O_3$.

Another embodiment for low temperature application is an as-batched tin-zinc-phosphate glass composition consisting essentially of in mole percent:
  40-50% SnO;
  25-40% $P_2O_5$; and
  15-30% ZnO.

Such glasses address the need for hermetic sealing of the exterior surface of an alumina membrane support structure to prevent gases from entering or exiting the support through the exterior surfaces instead of entering the open area of the channels, passing through the membrane coated channel walls and exiting through the unsealed walls of the support.

BRIEF DESCRIPTION OF THE DRAWINGS

The FIGURE illustrates one end of an alumina support with a hermetic coating sealing the end surfaces and outer curved surface of the alumina support, according to one embodiment.

DETAILED DESCRIPTION

This disclosure describes a hermetic sealing material in the form of a frit or frit blend, also referred to herein as a "glass sealing material", used for the hermetic sealing of the exterior surfaces of an alumina membrane support structure. The hermetic sealing material may be a glass composition as described herein or a blend of a glass composition as described herein and a filler as also described herein. The choice of hermetic sealing material used to seal the exterior surfaces of the support depends on the operating temperature of the supported membrane. The hermetic sealing material can be divided into 2 categories: those that form high temperature glassy coatings and those that form low temperature glassy coatings. Low temperature glass sealing materials are fired at a temperature of under 700° C. to prevent damage to the membrane layers while forming a glassy coating on the support. In addition, the low temperature glassy coating should be able to survive at 600° C. for several hours for post processing steps. High temperature glass sealing materials can be fired at a temperature of up to 1400° C. to form a glassy coating on the support. As used herein the term "glassy" means an amorphous glass-like coating formed from the hermetic sealing material after firing that may contain crystals that have formed during the firing process.

The glassy coating materials, formed after firing, described in this disclosure are capable of providing non-porous and hermetic seals on the exterior of an alumina membrane support structure. Hermetic is defined as completely sealed against the entry or escape of a gas. They are able to survive post processing steps such as deposition of other membrane layers. The materials are CTE (coefficient of thermal expansion) matched to the alumina membrane support structure. The frit should have zero mismatch or be in mild compression, for example, within $\pm 10 \times 10^{-7}/°$ C. from the alumina support CTE.

The membrane support structure comprises a flow-through substrate, such as an alumina honeycomb. The term "flow-through substrate" as used herein is a shaped body comprising inner passageways, such as straight or serpentine channels and/or porous networks that would permit the flow of a fluid stream through the body. The serpentine channel helps provide turbulent flow through the channels so as to keep the incoming gas mixed during the separation process. The alumina support has a selected length, an inlet end, an outlet end, and a porous outer curved surface between the inlet and outlet ends. The alumina support is in the form of a flow-through substrate having a plurality of channels with inner surfaces extending from the inlet end to the outlet end. The alumina support may have one or a plurality of membrane layers coating the inner surfaces of the channels of the alumina support.

The alumina support can be made according to suitable methods known in the art, for example, extrusion. Example alumina membrane support structures for membrane supports are disclosed in WO2008073417 A3.

The membrane layers comprise films or porous layers on the interior walls of the channels. The membranes may be organic or inorganic depending on the application. Examples of inorganic membranes and methods of making them are disclosed in WO2008106028 A1, US 20080299349 A1, US 20080299377 A1, and US 20090000475 A1.

The Figure illustrates one embodiment 10 of an alumina support with a hermetic coating sealing the end surfaces and outer curved surface of the alumina support; the alumina support 20 is in the form of a honeycomb substrate. The alumina support 20 has a plurality of channels 14, two end surfaces 12 (only one end surface is illustrated in the Figure), an uncoated porous curved outer surface 18b, a hermetic coating 16a applied to the end surfaces 12, and a hermetic coating 16b applied to the outer curved surface 18a of the support for a selected distance, L, from the end surface 12 (resulting an a coated outer curved surface 18a). A fitting 22 and a seal 24 (located at both ends of support 20) are used to contain the gas stream 30 entering the alumina support. The hermetic coating 16a, 16b seals the end surface 12 and a selected length, L of the coated outer curved surface 18a of the alumina support 20. The hermetic coating 16b extends a distance from the end surface 12 to create a sealed outer curved surface from the end surface 12 to the seal 24. The outer curved surface 18b in the center region of the support between the seals 24, located on both ends of the alumina support, is uncoated. The gas stream 30 enters the fitting 22 and enters the alumina support 20 through the open channels 14. The gas stream 30 cannot pass through the porous outer surface of the alumina support in this region from either direction (outside to inside or inside to outside) due to the hermetic coating. The gas travels through a distance to extend past the hermetically coated regions 16a, 16b, and seal 24. The gas may travel through the open channel, down the channel wall or a combination of both. A retentate gas 34 continues its path through the open channels 14 while a permeate gas 32 passes through the membrane layers, alumina support walls, and uncoated outer curved surface 18b of the alumina support 20.

For a high temperature application, in one embodiment, a zinc-alkali-silicate glass, combined with high levels (25-50 wt %) of inert fillers, for example, alumina and/or stabilized zirconia, can be utilized. Zircon may also be used as inert filler. Inert fillers do not react with the components of the glass composition. Because the as-batched glass is too fluid at the intended 1400° C. firing temperature to provide hermeticity, inert fillers are blended with the glass to increase the glass viscosity at 1400° C.

The glass compositions given here are on an as-batched basis. The transitional phrase "consisting essentially of" limits the scope of a claim to the specified materials or steps "and those that do not materially affect the basic and novel characteristic(s)" of the claimed invention. That is, as used herein the transitional phrase "consisting essentially of" means that the glass compositions or methods recited herein contain the specified elements, steps or ingredients as indicated and excludes additional elements, steps or ingredients which would materially affect the basic and novel characteristics of the glass, which are that the glass of the compositions of the invention can be made into a hermetic sealing material.

The glasses can include contaminants as typically found in commercially prepared glass. For example, while the glass may comprise zero mole percent barium on an as-batched basis (that is zero barium is added) analysis may find that the glass contains 0.05 mole percent or less of barium due to contamination. Such glass is considered herein as being "substantially free" of barium because the source of the barium is contamination of the batch starting materials. The same is true for arsenic and antimony. While the glass contains zero mole percent arsenic or antimony on the as-batched basis these elements may also be present in the glass due to contamination. Contamination levels are less than 0.05 mole percent. Thus, as with barium, glass composition found to contain arsenic and antimony are considered as being substantially free of these materials because their presence arises from the contamination of the starting materials and they are not intentionally added.

Two glass compositions are disclosed for the high temperature coating applications. One embodiment for high temperature application is an as-batched zinc-alkali-silicate glass composition consisting essentially of in mole percent:
60-70% $SiO_2$;
12-18% ZnO;
6-10% $Na_2O$;
6-10% $K_2O$;
1-4% $ZrO_2$; and
0.5-2.5% $Al_2O_3$.

Another embodiment for high temperature application is an as-batched zinc-alkali-silicate glass composition consisting essentially of in mole percent:
62-67% $SiO_2$;
14-16% ZnO;
7-9% $Na_2O$;
7-9% $K_2O$;
2-4% $ZrO_2$; and
0.5-2% $Al_2O_3$.

Another embodiment for high temperature application is an as-batched calcium silicoborate glass composition consisting essentially of in mole percent:
30-45% $B_2O_3$;
25-35% CaO;
23-30% $SiO_2$;
2-6% $Al_2O_3$; and
1-5% SrO.

Another embodiment for high temperature application is an as-batched calcium silicoborate glass composition consisting essentially of in mole percent:
36-40% $B_2O_3$;
27-31% CaO;
24-26% $SiO_2$;
3-5% $Al_2O_3$; and
1-4% SrO.

To create a hermetic seal on the outside of the alumina membrane support structure for low temperature applications, low glass transition ($T_g$) glass frits ($T_g$<350° C.) such as mixed alkali-zinc-phosphate or tin-zinc-phosphate glasses can be utilized. The relatively low $T_g$ frits from these glasses can be fired in the 500°-700° C. range to form hermetic coatings. These glasses typically have CTE values around $100 \times 10^{-7}$/° C., but this can be adjusted to match the CTE of the alumina membrane support, about $70$-$80 \times 10^{-7}$/° C., by adding inert fillers, for example, beta-eucryptite ($Li_2O.Al_2O_3.2SiO_2$), beta-quartz or beta-spodumene.

One embodiment for low temperature application is an as-batched mixed alkali-zinc-phosphate glass composition consisting essentially of in mole percent:
35-50% ZnO;
25-40% $P_2O_5$;
5-10% $Na_2O$;
5-10% $K_2O$;
1-5% $Li_2O$;
1-5% $MoO_3$;
0.5-4% $WO_3$; and
0.1-4% $Al_2O_3$.

Another embodiment for low temperature application is an as-batched mixed alkali-zinc-phosphate glass composition consisting essentially of in mole percent:
40-44% ZnO;
31-35% $P_2O_5$;
7-9% $Na_2O$;
6-8% $K_2O$;
2-4% $Li_2O$;
2-4% $MoO_3$;
1-3% $WO_3$; and
0.5-2% $Al_2O_3$.

Another embodiment for low temperature application is an as-batched tin-zinc-phosphate glass composition consisting essentially of in mole percent:
40-50% SnO;
25-40% $P_2O_5$; and
15-30% ZnO.

Another embodiment for low temperature application is an as-batched tin-zinc-phosphate glass composition consisting essentially of in mole percent:
42-46% SnO,
31-35% $P_2O_5$, and
20-24% ZnO.

The mole percents of the components of the glass compositions described herein are calculated on an oxide basis. The ranges of components in the glass composition comprise, in mole percent, any value including decimals in the range, for example, the range for $SiO_2$ includes 60-70 percent $SiO_2$ for instance 60-65 percent, for example 60.1-64.3 percent.

The glass are batched, melted, and cooled; after cooling they are ground to about 10-15 um/−325 mesh. Optionally and where necessary, inert fillers are added to the glass on a weight basis as necessary to either increase or decrease the CTE of the glass. Examples of fillers include zirconia, alumina, zircon, beta-eucryptite, beta-quartz, and beta-spodumene. For example, zirconia can be used to increase the CTE of the glass, while beta-eucryptite can be used to decrease the CTE of the glass. The blend of glass and filler is also referred to herein as a frit blend. The frit blend may comprise up to 8 wt %, up to 10 wt %, up to 12 wt %, up to 15 wt %, up to 20 wt %, up to 22 wt %, up to 25 wt %, up to 50 wt %, up to 55 wt % filler with the remainder of the frit blend being a glass composition as described in paragraphs [0020], [0021], [0022] [0023], [0025], [0026], [0027], or [0028]. The resulting frit blends are sieved through a 325 mesh screen. For high temperature applications, the frit blend may contain from 10 wt % to 60 wt % filler, preferably from 15 wt % to 50 wt % filler. For low temperature applications, the frit blend may contain from 0 wt % to 25 wt % filler. In some embodiments fillers are not necessary.

The frit blends are combined with suitable liquid vehicle and binder, for example, an amyl acetate vehicle and nitrocellulose binder. The paste can then be applied to the exterior of the membrane support structure using any suitable technique known in the art, for example, dip coating or air brushing. Depending on the application, the "fluidity" of the paste can be adjusted by varying the amount of liquid used to make the paste. For example, a paste for air brushing application may require more liquid than a paste for dip coating application.

One or a plurality of coatings of the hermetic sealing material may be used to minimize the possibility of leakage after sealing, for example 2 coatings, 3 coatings, 5 coatings, 8 coatings or 10 or more coatings. Surface roughness of the support may affect the efficiency of the sealing. For example, a rough surface may require more coatings of the hermetic sealing material than a smooth surface. Surface roughness and/or porosity of the support allows the hermetic sealing material to adhere to the support surface easily.

In some embodiments, drying is required between and/or after coating applications. Some embodiments require firing between coating applications and after final application. Typically, if 1-2 layers of hermetic sealing material are applied then only one firing cycle may be needed. If more than 2 layers of hermetic sealing material are applied, multiple firing cycles may be necessary. In all cases a firing step is required after the final layer of hermetic sealing material is applied. The firing temperatures vary according to whether the frit blend is a high temperature blend or a low temperature blend. Low temperature blends may be fired at a temperature of up to about 600° C., or up to about 700° C. High temperature blends may be fired at a temperature of up to about 1000° C., or up to about 1400° C. The support with hermetic sealing material coated thereon may be fired at a temperature of about 600° C., about 700° C., about 1000° C., or about 1400° C.

In some embodiments, the hermetic sealing material is applied to an alumina support and fired before the membrane layers are applied. In other embodiments, the hermetic sealing material is applied to an alumina support that comprises one or a plurality of membrane layers on the channel walls. If the hermetic sealing material is applied to an alumina support comprising one or a plurality of membrane layers, the membrane layers should be able to withstand the temperatures required for firing the hermetic sealing materials without degradation.

After firing the coating forms a glassy material that seals the surfaces to which it has been applied. When heated to a selected temperature the coating adheres to the exterior surface of the alumina support, hermetically sealing the surface to prevent ingress or egress of fluid.

Also described herein is a method for sealing exterior porous surfaces of an alumina support. The method comprising the steps of providing an alumina support optionally comprising a membrane; providing a hermetic sealing material; applying the hermetic sealing material to the ends of the channel wall surfaces and the outer curved surface of the support for a selected distance from the ends of the support; and firing the support having hermetic sealing material thereon.

EXAMPLES

Table 1 shows exemplary as-batched composition, in mole percent, of a glass used for a high temperature coating application. The glasses were melted in a covered platinum crucible at 1400° C. for 4 hours and then ground to about 10-15 microns/−325 mesh. The d50 (50% of particles are below this size) for glass A was 13 microns and 10 microns for glass B. Inert fillers were added to the glasses to increase the viscosity at 1400° C. Table 2 shows the frit blend compositions, on a weight basis, for the high temperature coatings. The frit blends were put in a Nalgene container, rolled with alumina balls for 20 minutes, and then sieved through a 325 m screen.

TABLE 1

As-batched composition of glass in mole percent used for high temperature hermetic sealing material.

| Oxides | Glass A | Glass B |
|---|---|---|
| $SiO_2$ | 64.3 | 25 |
| $Na_2O$ | 8.1 | 0 |
| $K_2O$ | 8.1 | 0 |
| ZnO | 15.3 | 0 |
| $ZrO_2$ | 2.9 | 0 |
| $Al_2O_3$ | 1.3 | 4 |
| SrO | 0 | 3 |
| CaO | 0 | 29.5 |
| $B_2O_3$ | 0 | 38.5 |

TABLE 2

Frit blend compositions in weight percent for high temperature hermetic sealing material.

| Materials | Frit blend 1 | Frit blend 2 | Frit blend 3 |
|---|---|---|---|
| Glass A (−325 mesh) | 50 | 50 | 0 |
| Glass B (−325 mesh) | 0 | 0 | 85 |
| Zircon ($ZrO_2 \cdot SiO_2$, Aimtek Inc.) | 50 | 25 | 0 |
| A3000 ($\alpha$-$Al_2O_3$, Alcoa) | 0 | 25 | 0 |
| Ca stabilized $ZrO_2$ | 0 | 0 | 15 |

Three different frit blends of glass A, glass B and filler were made for the high temperature application. Thin pastes of frit blends 1 and 2 were made using an amyl acetate vehicle and nitrocellulose binder. Alumina membrane supports were hand-dipped into the pastes of frit blend 1 or 2 and then fired on the following schedule: RT to 1000° C. at 5° C./min, 1000° C. to 1400° C. at 2° C./min, hold at 1400° C. for 1 hour then cool to RT at 5° C./min. Several of the samples coated with one layer of hermetic coating material were then dip coated a second time and re-fired at the same schedule. The coatings were glossy with no noticeable pores extending to the alumina membrane support surface.

A thin paste was made of frit blend 3 using an amyl acetate vehicle and nitrocellulose binder. Alumina membrane supports were air brushed using the paste of frit blend 3. The supports were air brushed with 2 layers of frit blend 3 paste, and then fired at 800° C. for 1 hour. After firing they were airbrushed again with 2 additional layers of frit blend 3 paste and fired a second time at 800° C. for 1 hour. The coated supports had a glossy brown appearance with no cracking or pin holes present in the coating.

The coated supports were then tested for leakage using a test system of Swagelok® fittings, along with 2 o-rings to provide a seal with the fittings. The test conditions used were a flow of 2000 sccm of $N_2$ introduced to the system. Only the permeate valve was opened to a wet test meter. The system was allowed to come to equilibrium and the gas flow was measured if any existed. Results after testing show that all of the samples with only one coating of hermetic sealing material contain some leakage. Results for the samples coated with two layers of frit blend 1 or 2 show no leaks at more than 150 psi. The results are shown in Table 3.

TABLE 3

Leak test results for high temperature coating application frit blends.

| Sample # | Description | Leak Rate (cc/min) | System pressure (psi) |
|---|---|---|---|
| Frit blend 1 | 1X coating | 20 | 153 |
| Frit blend 1 | 2X coating | 0 | 156 |
| Frit blend 2 | 1X coating | 73 | 149 |
| Frit blend 2 | 2X coating | 0 | 159 |
| Frit blend 3 | 2X coating | 62 | 80 |
| Frit blend 3 | 4X coating | 0 | 159 |

Table 4 shows exemplary as-batched composition, in mole percent, of the glasses used for the low temperature application. Glass C is an alkali-zinc-phosphate frit and glass D is a tin-zinc-phosphate frit. The glasses were melted in silica crucibles at 1000° C. for 1 hour. They were then poured on a steel table and allowed to cool to room temperature. The glasses were then ground to a particle size of about 10-15 microns. The specific d50 (50% of particles are smaller than this size) for glass C was 16 microns and 10 microns for glass D. The CTE for glasses C and D is in the range 90-110×$10^{-7}$/° C., a beta-eucryptite filler ($Li_2O.Al_2O_3.2SiO_2$) having a CTE of about −10×$10^{-7}$/° C., was used at different loading levels to lower the CTE of the glass C resulting in frit blends 4 and 5. No blends were made using glass D. Table 5 shows the compositions of the low temperature frit blends. The frit blends were combined on a weight basis, rolled slowly in a Nalgene bottle with alumina balls for 20 minutes, and then sieved through 325 m screen. Thin pastes were made of frit blends 4 and 5 using an amyl acetate vehicle and nitrocellulose binder. The frit blends were air brushed onto the alumina membrane supports by applying two air brush coatings and then firing the supports at 600° C. for 1 hour using a 2° C./min ramp rate. The supports were then coated with 2 additional air brushed layers and fired a second time at 600° C. for 1 hour using a 2° C./min ramp rate. This process was repeated for up to 6 and 8 layers total. One support coated with each frit blend 4 and 5 were also fired at a top temperature of 700° C. for 1 hour using 2° C./min ramp rate to determine if a higher firing temperature would help increase the flow of the material and there by yield a more uniform and non-porous coating.

TABLE 4

As-batched composition of glass in mole percent used for low temperature hermetic sealing material.

| Oxides | Glass C | Glass D |
|---|---|---|
| $Na_2O$ | 8.30 | 0 |
| $K_2O$ | 7.0 | 0 |
| ZnO | 41.6 | 22.3 |
| $Al_2O_3$ | 1.0 | 0 |
| SnO | 0 | 44.7 |
| $P_2O_5$ | 33.4 | 33.0 |
| $Li_2O$ | 3.70 | 0 |
| $WO_3$ | 2.0 | 0 |
| MoO3 | 3.0 | 0 |

TABLE 5

Frit blend compositions in weight percent for low temperature hermetic sealing material.

| materials | Frit blend 4 | Frit blend 5 |
|---|---|---|
| Glass C (16 μm, −325 mesh) | 80 | 90 |
| β-eucryptite 118VTC (+3/−7 μm) | 20 | 10 |

The coated supports were then tested for leakage using the same test apparatus and settings as described above for the high temperature materials. The results of the leak testing are shown in Table 6. The support with 8 coating layers of frit blend 5 was hermetic and passed the leak testing.

TABLE 6

Leak test results for low temperature coating application frit blends.

| Blend # or Glass | OD (mm) | Length (mm) | Coating process | Leak rate (cc/min) | System pressure (psi) |
|---|---|---|---|---|---|
| Frit blend 4 | 9.9 | 60 | 4X coated, 700 C.-1 hr | 1390 | 0.95 |
| Frit blend 4 | 9.8 | 60.3 | 4X coated, 600 C.-1 hr | 1393 | 1.3 |
| Frit blend 4 | 9.5 | 52.8 | 8X coated, 600 C.-1 hr | 1352 | 2.7 |
| Frit blend 5 | 9.7 | 47.12 | 8X coated, 600 C.-1 hr | 0 | 27.7 |
| Frit blend 5 | 9.7 | 49.5 | 4X coated, 700 C.-1 hr | 181 | 27.45 |
| Frit blend 5 | 9.7 | 55.3 | 4X coated, 600 C.-1 hr | 86 | 27.6 |
| Glass D | 9.6 | 49.5 | 4X coated, 600 C.-1 hr | 65 | 27.6 |

It should be understood that while the invention has been described in detail with respect to certain illustrative embodiments thereof, it should not be considered limited to such, as numerous modifications are possible without departing from the broad spirit and scope of the invention as defined in the appended claims.

Unless otherwise indicated, all numbers used in the specification and claims are to be understood as being modified in all instances by the term "about," whether or not so stated. It should also be understood that the precise numerical values used in the specification and claims form additional embodiments of the invention.

We claim:

1. A frit blend comprising:
   40 to 60 weight percent of a zinc-alkali-silicate glass, the zinc-alkali-silicate glass consisting essentially of, in mole percent:
   60-70% $SiO_2$;
   12-18% $ZnO$;
   6-10% $Na_2O$;
   6-10% $K_2O$;
   1-4% $ZrO_2$; and
   0.5-2.5% $Al_2O_3$; and
   40 to 60 weight percent of inert filler.

2. The fit blend according to claim 1 applied to an alumina support, where the CTE of the frit blend matches the CTE of the alumina support within $\pm 10 \times 10^{-7}/°$ C.

3. The frit blend according to claim 1, where the frit blend is substantially free of heavy metals.

* * * * *